United States Patent
Betzler et al.

(10) Patent No.: US 8,122,282 B2
(45) Date of Patent: Feb. 21, 2012

(54) STARTING VIRTUAL INSTANCES WITHIN A CLOUD COMPUTING ENVIRONMENT

(75) Inventors: Boas Betzler, Boeblingen (DE); Robert J. Etkins, Austin, TX (US); Holger J. Macho, Hopfenweg (DE); Marc-Arthur Pierre-Louis, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 12/722,809

(22) Filed: Mar. 12, 2010

(65) Prior Publication Data

US 2011/0225467 A1 Sep. 15, 2011

(51) Int. Cl.
*G06F 11/00* (2006.01)

(52) U.S. Cl. ............ 714/4.1; 714/4.11; 714/25; 714/48; 714/55

(58) Field of Classification Search .................... 714/4.1, 714/4.11, 25, 48, 55
See application file for complete search history.

(56) References Cited

U.S. PATENT DOCUMENTS

| | | | |
|---|---|---|---|
| 4,751,635 A | 6/1988 | Kret | |
| 5,951,686 A | 9/1999 | McLaughlin et al. | |
| 6,952,766 B2 | 10/2005 | Dervin et al. | |
| 7,149,889 B2 | 12/2006 | Stalker et al. | |
| 7,533,178 B2 | 5/2009 | Henniger | |
| 7,562,254 B2 | 7/2009 | Davis et al. | |
| 7,657,732 B2 | 2/2010 | Han | |
| 7,797,587 B2* | 9/2010 | Vasudevan et al. | 714/47.1 |
| 2002/0184482 A1 | 12/2002 | Lacombe et al. | |
| 2003/0028680 A1 | 2/2003 | Jin | |
| 2006/0041737 A1 | 2/2006 | Kumagai | |
| 2006/0126706 A1 | 6/2006 | Brand et al. | |
| 2008/0244253 A1 | 10/2008 | Corrao et al. | |
| 2008/0307259 A1* | 12/2008 | Vasudevan et al. | 714/23 |
| 2009/0210948 A1 | 8/2009 | Borghetti et al. | |
| 2010/0037089 A1* | 2/2010 | Krishnan et al. | 714/5 |
| 2010/0088698 A1* | 4/2010 | Krishnamurthy | 718/1 |
| 2010/0220622 A1* | 9/2010 | Wei | 370/252 |

(Continued)

OTHER PUBLICATIONS

Mell et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, 13 pages.

(Continued)

*Primary Examiner* — Charles Ehne
(74) *Attorney, Agent, or Firm* — William E. Schiesser; Ronald A. D'Alessandro; Keohane & D'Alessandro PLLC

(57) ABSTRACT

Embodiments of the present invention provide a system that leverages the Operational Support System(s) (OSS) and Business Support system(s) (BSS) of a (e.g., public) computing Cloud with a service to automate virtual instance restarts. For example, under embodiments of the present invention, a failed virtual instance is detected within the Cloud computing environment, and a request for a new virtual instance is received in response thereto. Upon receiving the request, an entitlement of a user associated with the failed virtual instance will be tested. Specifically, a set of authentication calls and checks are deployed in accordance herewith to ensure the integrity of the requests, as well as the authorization of the requester for the resource use. Assuming testing is passed, a countdown timer associated with the failed virtual instance will be decreased. When the countdown timer reaches a predetermined threshold (e.g., zero), the new virtual instance will be started, the failed virtual instance will be terminated, and the countdown timer will be reset/restarted by instance. Integration with BSS further allows for monitoring and charging of service usage as well as opening the option for pay-as-you-go charges for the restart service itself.

22 Claims, 5 Drawing Sheets

U.S. PATENT DOCUMENTS

2010/0223378 A1* 9/2010 Wei .............................. 709/224
2010/0332889 A1* 12/2010 Shneorson et al. ................ 714/2
2011/0022694 A1* 1/2011 Dalal et al. .................... 709/222
2011/0022883 A1* 1/2011 Hansen ............................ 714/4
2011/0119668 A1* 5/2011 Calder et al. ...................... 718/1

OTHER PUBLICATIONS

PCT/EP2011053489. International Search Report dated Jul. 22, 2011.

* cited by examiner

STARTING VIRTUAL INSTANCES WITHIN A CLOUD COMPUTING ENVIRONMENT

TECHNICAL FIELD

The present invention generally relates to Cloud computing. Specifically, the present invention relates to starting virtual instances within a Cloud computing environment.

BACKGROUND

The Cloud computing environment is an enhancement to the predecessor grid environment, whereby multiple grids and other computation resources may be further abstracted by a Cloud layer, thus making disparate devices appear to an end-user as a single pool of seamless resources. These resources may include such things as physical or logical compute engines, servers and devices, device memory, storage devices, networks, business applications and other software, and the like.

In a typical Cloud environment, customers will have corresponding virtual "customer" instances through which desired functionality is achieved. Occasionally, these instances fail (e.g., due to corruption, attack, etc.). Existing solutions require multiple system instances to monitor each other. If the multiple instances reside on the same physical node, they would all become unavailable in case the physical node malfunctions. Further, in many Cloud systems, the virtualized view does not expose the physical assignment. Moreover, existing solutions inherently assume a certain level of trust between the components, which cannot be assumed in a public Cloud environment. Among the potential exploitations are the unauthorized uses of the available service to: mount denial-of-service attacks; access confidential data of another Cloud user; and/or incur unauthorized cost.

SUMMARY

Embodiments of the present invention provide a system that leverages the Operational Support System(s) (OSS) and Business Support System(s) (BSS) of a computing Cloud (e.g., public) with a service to automate virtual instance restarts. Specifically, under embodiments of the present invention, a failed virtual instance (e.g., virtual machine) is detected within the Cloud computing environment and a request for a new virtual instance is received in response thereto. Upon receiving the request, an entitlement of a user associated with the failed virtual instance will be tested. Specifically, a set of authentication calls and checks are deployed to ensure the integrity of the requests as well as the authorization of the requester for the resource use. Assuming testing is passed, a countdown timer associated with the failed virtual instance will be decreased. When the countdown timer reaches a predetermined threshold (e.g., zero), the new virtual instance will be started, the failed virtual instance will be terminated, and the countdown timer will be reset/restarted by instance. Integration with BSS further allows for monitoring and charging of service usage, as well as opening the option for pay-as-you-go charges for the restart service itself. Initiation of a new virtual instance can comprise: a restart of the old virtual instance; and/or a starting of a distinct and separate virtual instance.

A first aspect of the present invention provides a method for starting a virtual instance within a Cloud computing environment, comprising: detecting a failed virtual instance within the Cloud computing environment; receiving a request for a new virtual instance in response to the failed virtual instance; testing an entitlement of a user associated with the failed virtual instance; decreasing a countdown timer associated with the failed virtual instance; starting the new virtual instance when the countdown timer reaches a predetermined threshold; and terminating the failed virtual instance.

A second aspect of the present invention provides a system for starting a virtual instance within a Cloud computing environment, comprising: a memory medium comprising instructions; a bus coupled to the memory medium; and a processor coupled to the bus that when executing the instructions causes the system to: detect a failed virtual instance within the Cloud computing environment; receive a request for a new virtual instance in response to the failed virtual instance; test an entitlement of a user associated with the failed virtual instance; decrease a countdown timer associated with the failed virtual instance; start the new virtual instance when the countdown timer reaches a predetermined threshold; and terminate the failed virtual instance.

A third aspect of the present invention provides a computer readable medium containing a program product for starting a virtual instance within a Cloud computing environment, the computer readable medium comprising program code for causing a computer to: detect a failed virtual instance within the Cloud computing environment; receive a request for a new virtual instance in response to the failed virtual instance; test an entitlement of a user associated with the failed virtual instance; decrease a countdown timer associated with the failed virtual instance; start the new virtual instance when the countdown timer reaches a predetermined threshold; and terminate the failed virtual instance.

A fourth aspect of the present invention provides a method for deploying a system for starting a virtual instance within a Cloud computing environment, comprising: providing a computer infrastructure being operable to: detect a failed virtual instance within the Cloud computing environment; receive a request for a new virtual instance in response to the failed virtual instance; test an entitlement of a user associated with the failed virtual instance; decrease a countdown timer associated with the failed virtual instance; start the new virtual instance when the countdown timer reaches a predetermined threshold; and terminate the failed virtual instance.

BRIEF DESCRIPTION OF THE DRAWINGS

These and other features of this invention will be more readily understood from the following detailed description of the various aspects of the invention taken in conjunction with the accompanying drawings in which.

Figure 1:
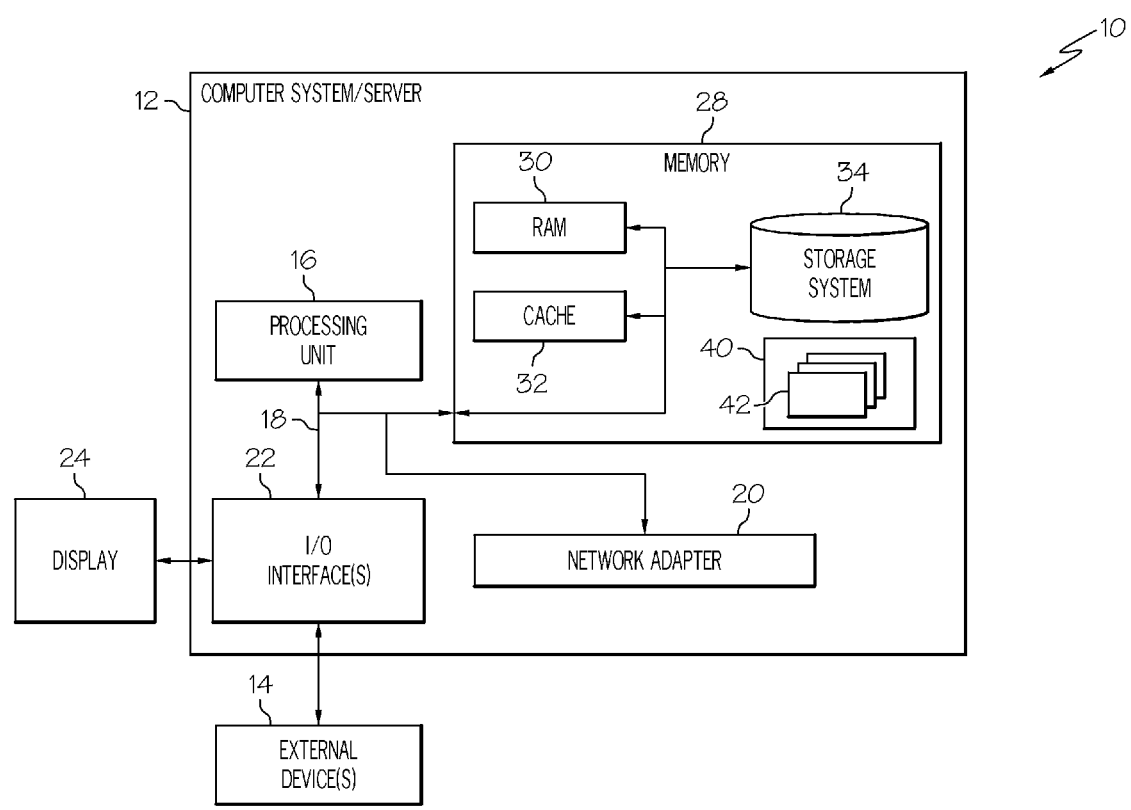
FIG. 1 depicts a Cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. Cloud Computing Definitions
II. Detailed Implementation of Embodiments of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A customer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple customers using a multi-tenant model, with different physical and virtual resources dynamically assigned and reassigned according to customer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the customer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and customer of the utilized service.

Service Models are as follows:

Cloud Software as a Service (SaaS): The capability provided to the customer is to use the provider's applications running on a Cloud infrastructure. The applications are accessible from various client devices through a thin client interface such as a web browser (e.g., web-based email). The customer does not manage or control the underlying Cloud infrastructure including network, servers, operating systems, storage, or even individual application capabilities, with the possible exception of limited user-specific application configuration settings.

Cloud Platform as a Service (PaaS): The capability provided to the customer is to deploy onto the Cloud infrastructure customer-created or acquired applications created using programming languages and tools supported by the provider. The customer does not manage or control the underlying Cloud infrastructure including networks, servers, operating systems, or storage, but has control over the deployed applications and possibly application-hosting environment configurations.

Cloud Infrastructure as a Service (IaaS): The capability provided to the customer is to provision processing, storage, networks, and other fundamental computing resources where the customer is able to deploy and run arbitrary software, which can include operating systems and applications. The customer does not manage or control the underlying Cloud infrastructure, but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of Embodiments of the Invention

Embodiments of the present invention provide a system that leverages the Operational Support System(s) (OSS) and Business Support system(s) (BSS) of a (e.g., public) computing Cloud with a service to automate virtual instance restarts. Specifically, under embodiments of the present invention, a failed virtual instance (e.g., virtual machine) is detected within the Cloud computing environment and a request for a new virtual instance is received in response thereto. Upon receiving the request, an entitlement of a user associated with the failed virtual instance will be tested. Specifically, a set of authentication calls and checks are deployed to ensure the integrity of the requests as well as the authorization of the requester for the resource use. Assuming testing is passed, a countdown timer associated with the failed virtual instance will be decreased. When the countdown timer reaches a predetermined threshold (e.g., zero), the new virtual instance will be started, the failed virtual instance will be terminated, and the countdown timer will be reset/restarted by instance. Integration with BSS further allows for monitoring and charging of service usage as well as opening the option for pay-as-you-go charges for the restart service itself. Initiation of a new virtual instance can comprise: a restart of the old virtual instance; and/or a starting of a distinct and separate virtual instance. It is understood in advance in a typical embodiment that virtual instance refers to a Virtual Machine (VM) associated with a Cloud customer.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable customer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
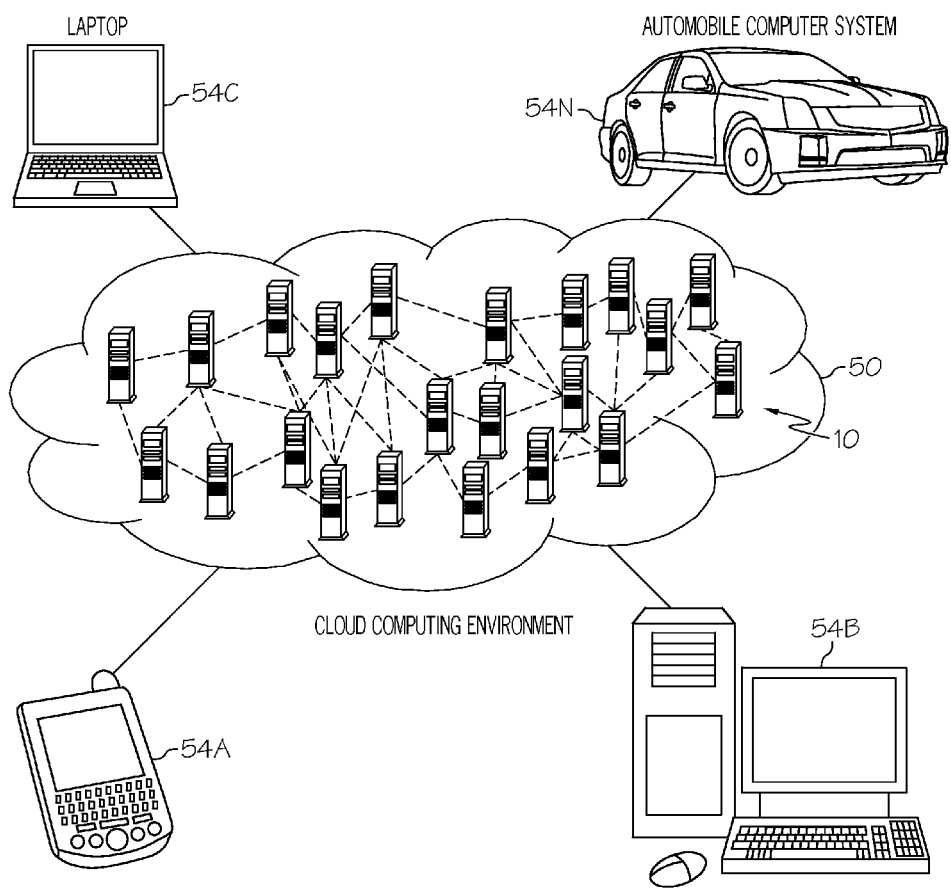
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50 so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
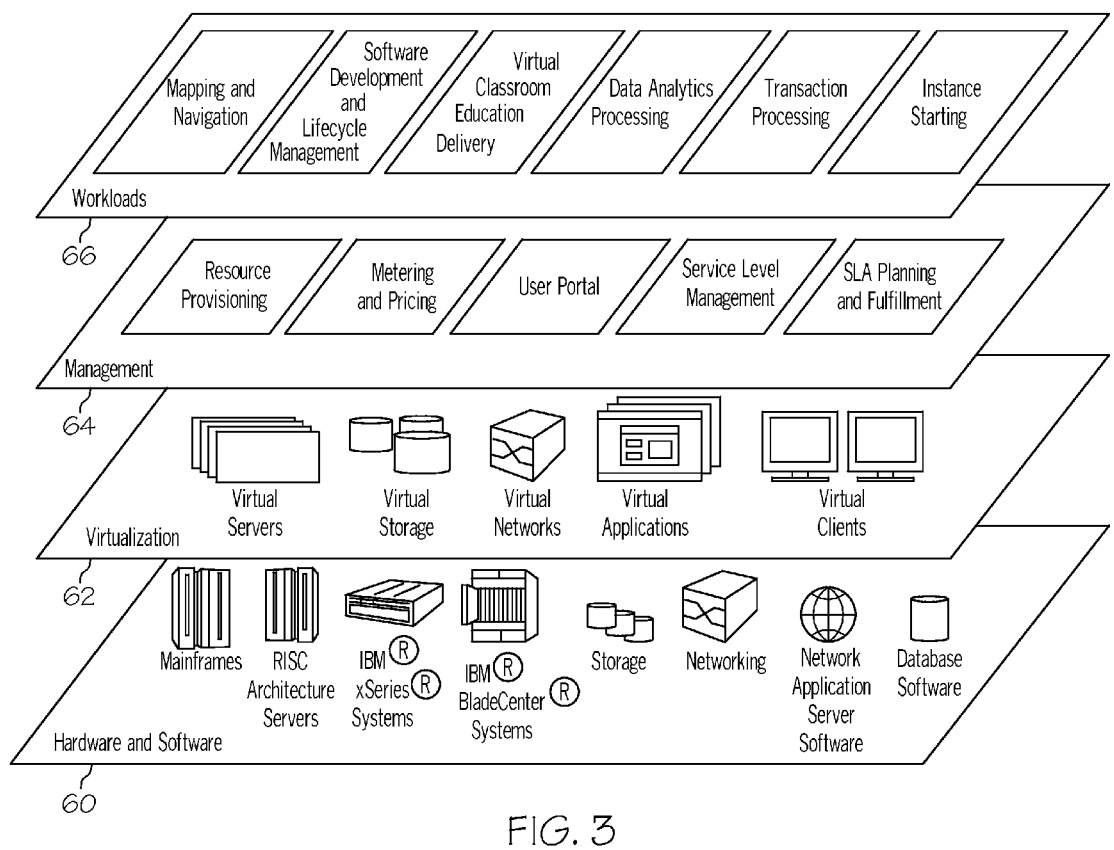
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and instance starting. As mentioned above, all of the foregoing examples described with respect to FIG. 3 are illustrative only, and the invention is not limited to these examples.

It is understood all functions of the present invention as described herein are typically performed by instance starting, which can be tangibly embodied as modules of program code 42 of program/utility 40 (FIG. 1).

Figure 4:
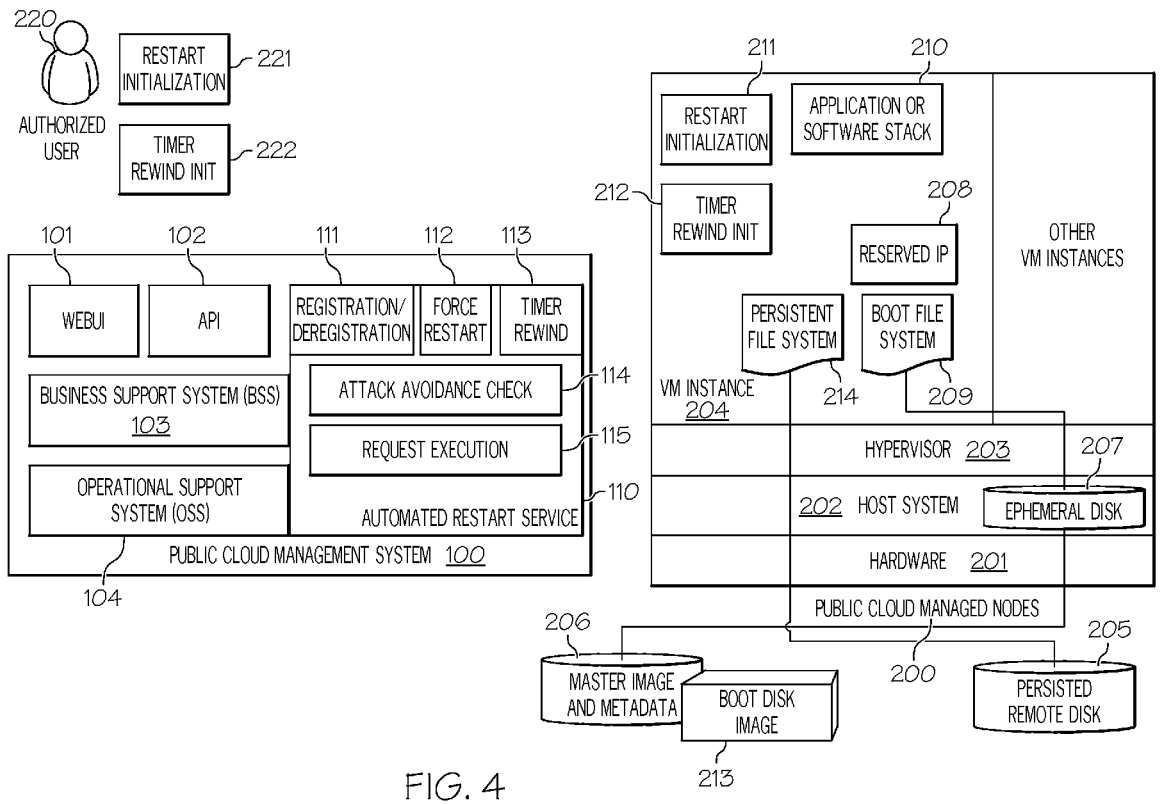
FIG. 4 depicts a system for automated virtual instance starting within a Cloud computing environment according to an embodiment of the present invention.

Referring now to FIG. 4, an architectural diagram according to the present invention is shown. It is understood that some of the components shown in FIG. 4-5 correspond to components in FIGS. 1-3. For example, Cloud nodes 200 correspond to Cloud nodes 10. Separate reference numerals have been provided in FIG. 4-5 simply to provide clarity and ease of reading. It is further understood that embodiments of the present invention leverage Operational Support System(s) (OSS) and Business Support System(s) (BSS) for Cloud environment 50 (FIG. 2). These systems are typically defined as follows:

Operational Support System: The OSS deals with computing, networking, storage, and other resources, and includes inventory management, provisioning management, change management, and incident management (among other things). The OSS is able to provision a plurality of virtual machine instances on a plurality of physical server systems that run a virtualization hypervisor. The provisioning can further include the selection of an initial boot image for the virtual machine instance and a reserved IP address to be assigned to the requested instance, as well as assigning persistent storage devices to provisioned instance.

Business Support System: Working together with the OSS, the BSS deals with end-user subscriptions, orders management, metering collection, and rating, as well as chargeback or payment. Typical types of activities that can be performed by the BSS are (among others) taking a customer's order, configuring network components, creating a bill, and managing faults.

In any event, as shown in FIG. 4, an authorized user/customer 220 interacts with either a Web user interface (UI) 101 or through a software intermediary using an API 102 to create a virtual machine instance 204 on Cloud node 200 (which is shown in conjunction with hardware 202, host system 202, hypervisor 203, and ephemeral disk 207). This instance has the following further characteristics (among others): It is created from a master image 213 that is owned and created by the authorized user 220. This is to avoid the unauthorized starting of images with potentially private data. The instance 204 has associated a reserved Internet protocol (IP) address 208 that is owned by user 220. Optionally, a persistent disk is mounted as a file system 214 in said instance. The instance also includes an application of software stack 210 that is configured in a way that automatically starts and becomes operational, when the boot disk images 213 is provisioned in an instance 204.

To invoke the automated restart service 110, there are two options: either the authorized user 220, after authenticating with the web UI 101, or the API 102 registers with the automated restart service 111 called from any restart initialization service 221 on the network and initializes the rewind timer 222. In this case, the attack avoidance check 114 will ensure that the requesting user 220 is identical to the user that owns the Virtual machine VM instance 204 and that he is the user that requested the reserved IP address 208.

Alternatively, a restart initialization 211 in the virtual machine instance 204 includes calling the registration 111. In this case, the attack avoidance check 114 will ensure that the originating IP caller address is the reserved IP address 208 and that a certificate authenticating the originator 220 of the VM instance 204 is valid.

In both cases, the attack avoidance check 114 is testing that the restart request includes metadata with the following characteristics: user 220 is the owner of the initial boot disk image 213, the owner of the VM instance 204, the reserved IP address 208, and the optional persistent disk 214; and that the restart request is for restarting the same configuration that is currently running, that means the same boot disk image 213 and IP address 208 and other metadata that was used in the original create instance request. It will further test in the BSS 103 that the user is entitled to the restart service for this instance/image combination.

During normal operation, the VM instance 204 will in regular intervals, through the countdown timer rewind 212, reset/restart the countdown timer 113. Alternatively, a separate module 222 can perform this operation. For each registered instance, the countdown timer in the automated restart service 110 is counting down at regular intervals. In case the countdown timer rewind 113 is not called for a period of time, the countdown timer will drop down to zero, at which time the following actions take place:

Request execution 115 checks with the OSS 104 whether there is a general outage condition;

Request execution 115 interacts with OSS 104 to terminate VM instance 204, un-assign the reserved IP address 208 and un-mount the optional persistent remote disk 205;

Request Execution 115 interacts with OSS 104 to start a new VM instance, deploy the registered boot disk image 213, assign the reserved IP address 208, and mount the optional persistent file system 214. Based on these actions, the software application stack 210 is now operational on a new VM instance with the same IP address and the same persistent data that was available prior to the restart.

Close integration between the automated restart service 110 and the OSS 104 and BSS 103 ensures that the restart can be metered and optionally charged to the authorized user. For example, an hourly or daily rate for use of the restart service can be charged between registration and deregistration, or other events like an actual restart could trigger metering events. Such integration also enables status and restart messages to be exposed to the user through the web UI 101.

Forced restart: A forced restart 112 of an instance can be triggered by the VM instance or by an authorized user. In this case, the same attack avoidance check 114 is executed, that is also used in the zero timer case.

Automated site restart: In case of a complete system failure, both 100 and 200, for example, including the OSS and BSS, registrations 111 of restarts are maintained. When OSS and BSS are restarted, the request execution 115 will walk though all registrations and perform a restart of some or all registered instances.

Deregistration: Both authorized users and the VM instances can deregister the automated restart registration at any time. In this case, the attack avoidance check will again test the authorization and consistency of the request to avoid malicious requests to make instances vulnerable.

Restart initialization 221: This component resides in the image, which is a template of the running instance. The component is called during the initial boot of the instance so that it registers 111 with the Automated Restart Service 110. In that way, the instance can derive quality of service through restart from the service without user intervention. Also, master images that include high availability enablement can be made available in the offering catalog in the BSS 103 that do not require additional configuration or administrator intervention.

Figure 5:
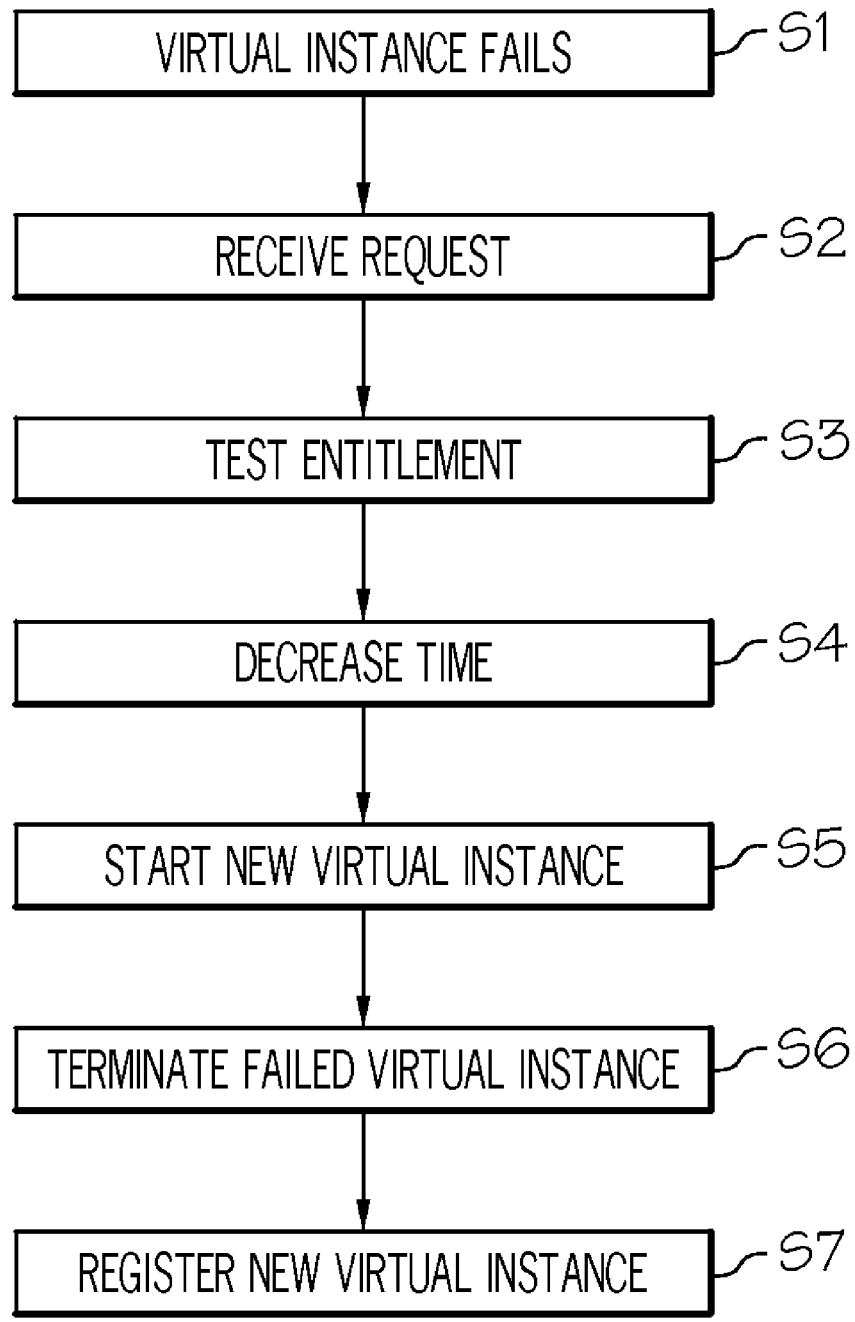
FIG. 5 depicts a method flow diagram according to an embodiment of the present invention.

Referring now to FIG. 5, a flow diagram according to an embodiment of the present invention is shown. As depicted in step S1, a failed virtual instance is detected. In step S2, a request for a new virtual instance is received in response to the failed virtual instance. In step S3, an entitlement of a user associated with the failed virtual instance is tested. Included with this step is the determination whether the user is an owner of: the virtual failed instance; a boot image associated with the failed virtual instance; a reserved Internet Protocol (IP) associated with the failed virtual instance; and/or persistent storage associated with the failed virtual instance. In step S4, a countdown timer associated the failed virtual instance is decreased. In step S5, the new virtual instance is started when the countdown timer reaches a predetermined threshold. In step S6, the failed virtual instance is terminated. In step S7, the new virtual instance is registered (e.g., a boot image, a reserved IP, and persistent storage of the new virtual instance is registered for the user).

While shown and described herein as automated virtual instance starting solution, it is understood that the invention further provides various alternative embodiments. For example, in one embodiment, the invention provides a computer-readable/useable medium that includes computer program code to enable a computer infrastructure to provide a virtual instance starting solution. To this extent, the computer-readable/useable medium includes program code that implements each of the various processes of the invention. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

In another embodiment, the invention provides a method that performs the process of the invention on a subscription, advertising, and/or fee basis. That is, a service provider, such as a Solution Integrator, could offer to provide automated virtual instance starting solution. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for automated virtual instance starting. In this case, a computer infrastructure, such as computer infrastructure 102 (FIG. 4), can be provided, and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 4), from a computer-readable medium; adding one or more computing devices to the computer infrastructure; and incorporating and/or modifying one or more existing systems of the computer infrastructure to enable the computer infrastructure to perform the process of the invention.

A computer readable signal medium may include a propagated data signal with computer readable program code embodied therein; for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for starting a virtual instance within a Cloud computing environment, comprising:
   detecting a failed virtual instance within the Cloud computing environment;
   receiving a request for a new virtual instance in response to the failed virtual instance;
   testing an entitlement of a user associated with the failed virtual instance, wherein the testing comprises determining whether the user is an owner of the failed virtual instance;
   decreasing a countdown timer associated with the failed virtual instance;
   starting the new virtual instance when the countdown timer reaches a predetermined threshold; and
   terminating the failed virtual instance.

2. The method of claim 1, the new virtual instance comprising a virtual machine.

3. The method of claim 1, the testing further comprising determining whether the user is an owner of a boot image associated with the failed virtual instance.

4. The method of claim 1, the testing further comprising determining whether the user is an owner of a reserved Internet Protocol (IP) address associated with the failed virtual instance.

5. The method of claim 1, the testing further comprising determining whether the user is an owner of persistent storage associated with the failed virtual instance.

6. The method of claim 1, the predetermined threshold comprising zero.

7. The method of claim 1, further comprising registering a boot image, a reserved IP address, and persistent storage of the new virtual instance for the user.

8. The method of claim 1, the new virtual instance comprising a restart of the failed virtual instance.

9. A system for starting a virtual instance within a Cloud computing environment, comprising:
   a memory medium comprising instructions;
   a bus coupled to the memory medium; and
   a processor coupled to the bus that when executing the instructions causes the system to:
      detect a failed virtual instance within the Cloud computing environment;
      receive a request for a new virtual instance in response to the failed virtual instance;
      test an entitlement of a user associated with the failed virtual instance, wherein the test comprises determining whether the user is an owner of the failed virtual instance;
      decrease a countdown timer associated with the failed virtual instance;
      start the new virtual instance when the countdown timer reaches a predetermined threshold; and
      terminate the failed virtual instance.

10. The system of claim 9, the failed virtual instance comprising a virtual machine.

11. The system of claim 9, the test further comprising determining whether the user is an owner of a boot image associated with the failed virtual instance.

12. The system of claim 9, the test further comprising determining whether the user is an owner of a reserved Internet Protocol (IP) address associated with the failed virtual instance.

13. The system of claim 9, the test further comprising determining whether the user is an owner of persistent storage associated with the failed virtual instance.

14. The system of claim 9, the system further being caused to register a boot image, a reserved IP address, and persistent storage of the new virtual instance for the user.

15. A non-transitory computer readable medium containing a program product for starting a virtual instance within a within a Cloud computing environment, the computer readable medium comprising program code for causing a computer to:
   detect a failed virtual instance within the Cloud computing environment;
   receive a request for a new virtual instance in response to the failed virtual instance;
   test an entitlement of a user associated with the failed virtual instance, wherein the test comprises determining whether the user is an owner of the failed virtual instance;
   decrease a countdown timer associated with the failed virtual instance;
   start the new virtual instance when the countdown timer reaches a predetermined threshold; and
   terminate the failed virtual instance.

16. The computer readable medium containing the program product of claim 15, the failed virtual instance comprising a virtual machine.

17. The computer readable device containing the program product of claim 15, the test further comprising determining whether the user is an owner of a boot image associated with the failed virtual instance.

18. The computer readable device containing the program product of claim 15, the test further comprising determining whether the user is an owner of a reserved Internet Protocol (IP) address associated with the failed virtual instance.

19. The computer readable device containing the program product of claim 15, the test further comprising determining whether the user is an owner of persistent storage associated with the failed virtual instance.

20. The computer readable device containing the program product of claim 15, the predetermined threshold comprising zero.

21. The compute readable medium containing the program product of claim 15, the computer readable medium further comprising program code for causing the computer to register a boot image, a reserved IP address, and persistent storage of the new virtual instance for the user.

22. A method for deploying a system for starting a virtual instance within a Cloud computing environment, comprising:
provided a computer infrastructure being operable to:
  detect a failed virtual instance within the Cloud computing environment;
  receive a request for a new virtual instance in response to the failed virtual instance;
  test an entitlement of a user associated with the failed virtual instance, wherein the test comprises determining whether the user is an owner of the failed virtual instance;
  decrease a countdown timer associated with the failed virtual instance;
  start the new virtual instance when the countdown timer reaches a predetermined threshold; and
  terminate the failed virtual instance.

* * * * *